March 26, 1929.  F. A. WHITTEN  1,706,506
GENERATOR COVER
Filed May 7, 1927  2 Sheets-Sheet 1
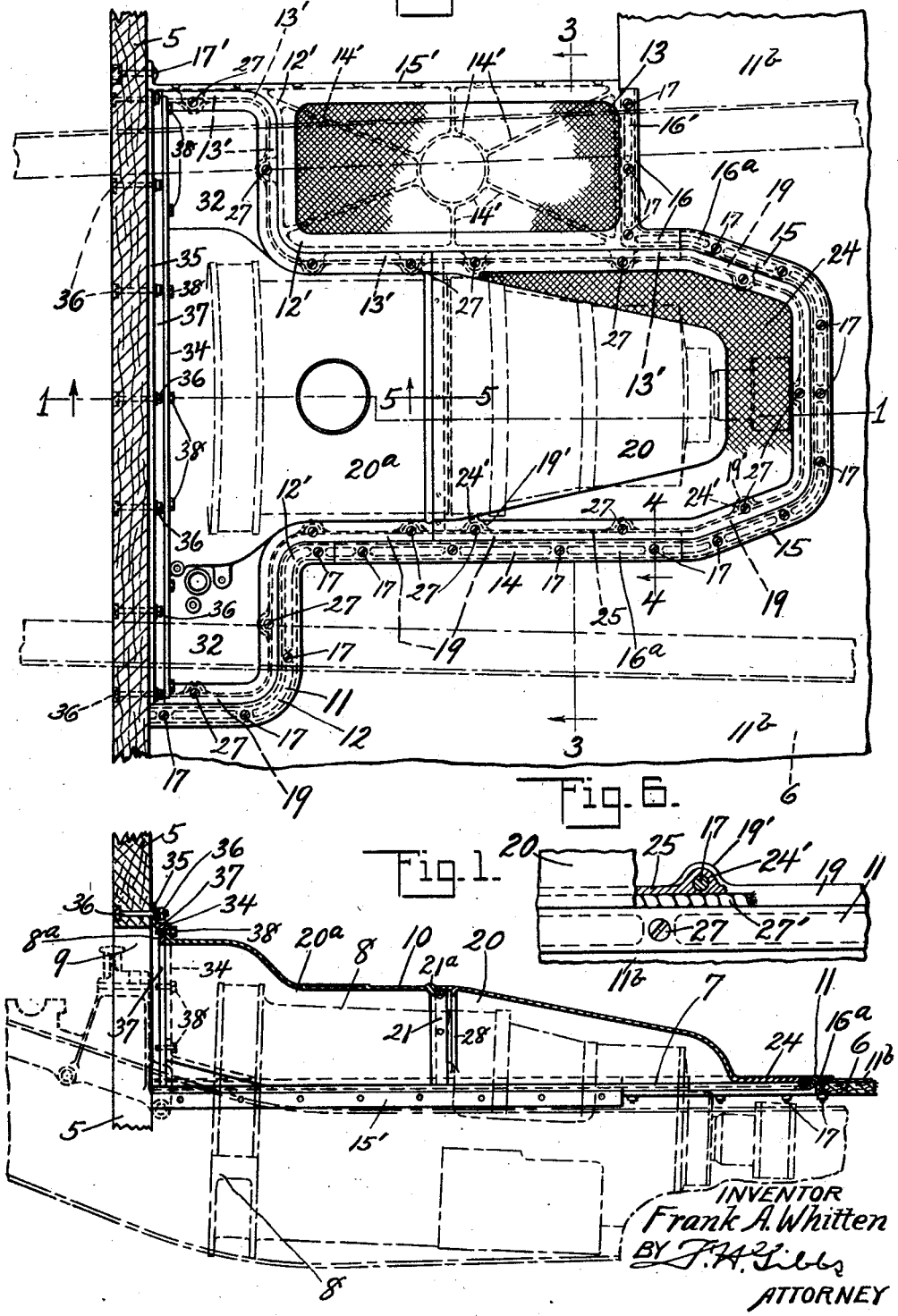
INVENTOR
Frank A. Whitten
BY
ATTORNEY March 26, 1929.　　F. A. WHITTEN　　1,706,506
GENERATOR COVER
Filed May 7, 1927　　2 Sheets-Sheet 2
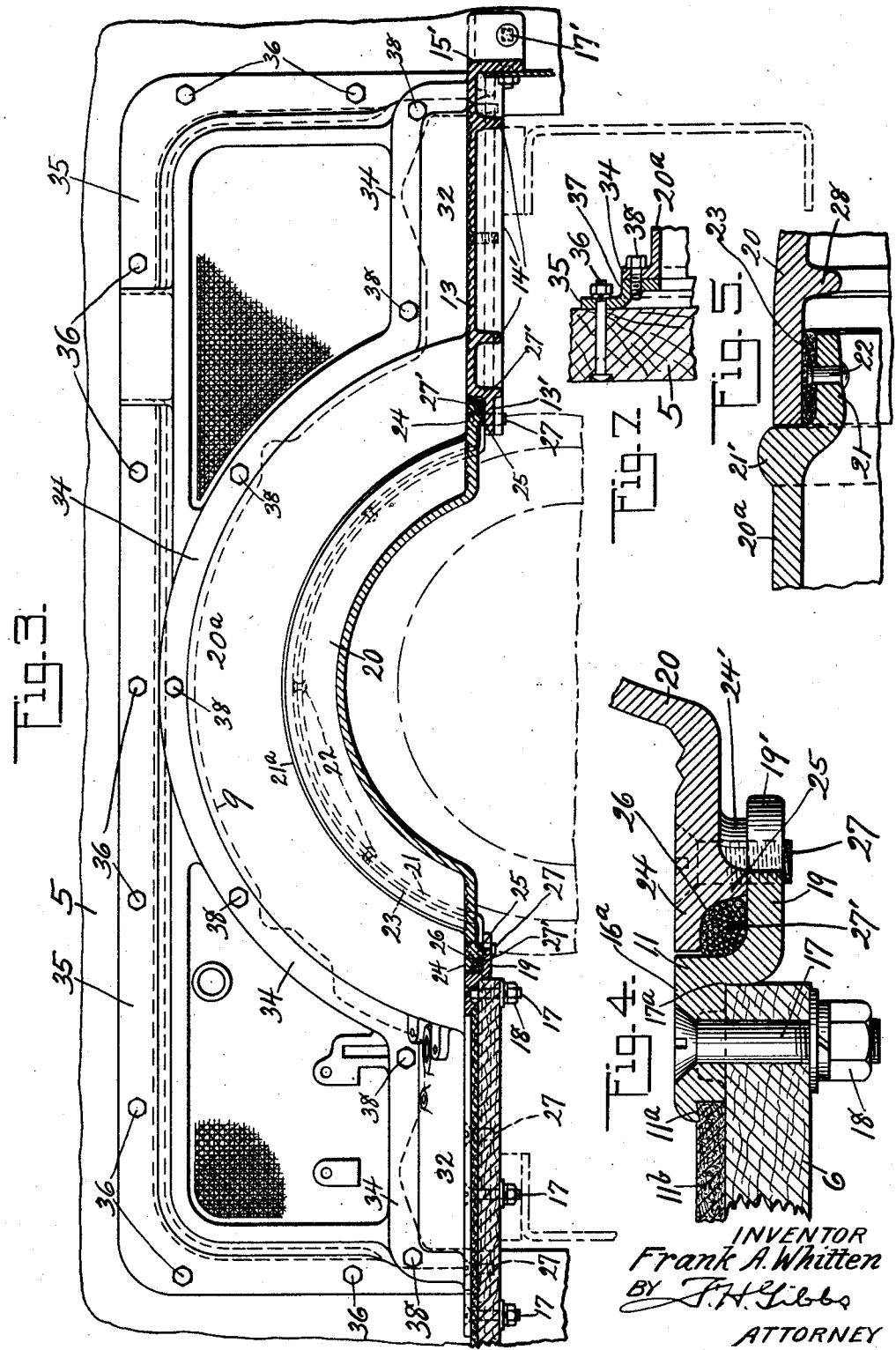
INVENTOR
Frank A. Whitten
BY J.H.Gibbs
ATTORNEY Patented Mar. 26, 1929.

1,706,506

UNITED STATES PATENT OFFICE.

FRANK A. WHITTEN, OF DETROIT, MICHIGAN, ASSIGNOR TO AMERICAN CAR AND FOUNDRY MOTORS COMPANY, OF NEW YORK, N. Y., A CORPORATION OF DELAWARE.

GENERATOR COVER.

Application filed May 7, 1927. Serial No. 189,604.

Reference is had to the accompanying drawings which illustrate the preferred form of the invention; though it is to be understood that the invention is not limited to the exact details of construction shown and described, as it is obvious that various modifications thereof within the scope of the claims will occur to persons skilled in the art.

In said drawings:

Figure 1 is a sectional view taken on the line 1—1 of Fig. 2, showing the generator in broken lines.

Fig. 2 is a top plan view, partly in section, of a portion of a motor vehicle adjacent the generator, showing the generator cover in position on its supporting means.

Fig. 3 is a sectional view on the line 3—3, Fig. 2.

Fig. 4 is a detail sectional view on the line 4—4, Fig. 2.

Fig. 5 is a detail sectional view on the line 5—5, Fig. 2.

Fig. 6 is a fragmentary top plan view, partly in section of the cover supporting frame, and Fig. 7 is a detail sectional view of a portion of the dash of a motor vehicle showing the generator cover attaching means.

This invention relates to motor vehicle and refers more particularly to the cover for an electric generator, which generator is indicated in broken lines in Figs. 1 and 2.

One object of the present invention is to provide a cover for an electric generator which may be easily and quickly attached to and detached from the floor of the vehicle.

Another object of the invention is to provide means for supporting the cover for an electric generator, which means are so formed that they will withstand frequent and hard usage with resulting injury or mutilation thereof and the connecting means for the cover reduced to a minimum.

Referring now more particularly to the drawings, 5 indicates the dash of a vehicle and 6 indicates the floor thereof, the latter being provided with an opening 7 through which the upper portion of the generator 8 projects. This construction is usual at the present time.

The cover for the generator is indicated generally at 10, and the particular construction thereof will be hereafter described.

It has been found that if the cover is connected directly to the floor 6, the fastening means therefor become loosened due to frequent and hard usage and the cover is not firmly retained in place. To eliminate this disadvantage, the present invention comprehends a supporting frame for the cover indicated generally at 11, and arranged around the opening 7 and secured to the floor 6 adjacent said opening.

The frame is of the form illustrated in Fig. 2 and comprises an angle 12 with the extreme end thereof secured to the dash 5, a side 14, a substantially U-shaped end 15 and an angle 16 having the step plate 13 formed therewith, the front end of which terminates in an angle 12′ having its extreme end secured to the dash as shown at 17′. The frame just described has been shown as formed of several independent sections, but obviously such frame might be formed of a single section by being cast or otherwise suitably made, within the spirit of the invention.

Fig. 4 discloses a cross sectional view of the frame wherein it can be seen that the plate 11 is shown as supported on the floor 6 and provided with an undercut portion 11$^a$ which receives the floor covering 11$^b$, the latter being overlapped by the outer edge of the frame 11.

More particularly, the frame comprises the floor surface 16$^a$, of strip form, which is secured to the floor 6 by bolts 17 or the like, having securing nuts 18 at their free ends, and an inwardly projecting continuous supporting seat 19 offset from the floor surface 16$^a$ and arranged within the opening 7. The frame is so formed as to provide an angle 17$^a$ which, in effect, positions the frame 11 with respect to the floor 6 and aids in retaining said frame in such position.

The seat 19 is formed integral with the floor surface 16$^a$ and extends to the end of the short arm of angle 16, and the frame from this point on is formed with a step plate 13, the inner edge of which is provided with an inwardly extending continuous cover supporting seat 13′ which is similar in all respects to the seat 19. The rear end of the step plate is, in reality, the long arm of the angle 16; said long arm being designated as 16′, the latter being secured to the floor 6. The step plate 13 is substantially rectangular in form as is usual in such constructions and and is provided with reinforcing ribs 14' on its under surface, and its outer edge is downwardly flanged as shown at 15', the latter being extended forwardly beyond the front edge of the plate, defining with said front edge, an angle 12', the extreme end of which, as before mentioned, is secured to the dash 5. The supporting seat 13' extends along the inner edge of the step plate, as before mentioned and is continued on the angle 12'.

The seat 19 and its continuation 13' are each provided at spaced intervals, with lugs 19', as shown particularly in Fig. 6, the purpose of which will be hereafter set forth.

Referring now to the generator cover 10, which is specifically illustrated in Figs. 1 and 5, it can be seen that the same comprises two curved hoods connected together end to end and providing a structure tapered upwardly from the floor 6 to the dash 5, and conforming generally in shape to the outline of the generator 8. The two hoods are designated as 20 and 20ª and the former is provided around its edge with a web 24, the edge of which conforms in shape with the general outline of the opening 7, or more particularly, is so formed as to be complemental with the adjacent portion of the frame 11. The web 24, in effect, constitutes a portion of the floor of the vehicle to the extent that passengers necessarily step on the same in entering or leaving the vehicle, and therefore the web 24 is arranged in line with the floor surface 16ª of the frame 11, and its alignment is assured by reason of the contact of a ridge 25 formed on the cover 20 and extending around the web, (see Fig. 4).

The web 24 is provided with apertured bosses 24' which are positioned upon the lugs 19', as heretofore described; it being understood that the lugs on said seat 19 are so spaced that they will be in line with the lugs 24' when the parts are assembled; this being a question of predetermining the arrangement of the lugs 24' and 19' with respect to each other during the manufacture of the parts. Screws 27 are provided which pass through the apertured bosses 24' and also through apertures formed in the lugs 19', whereby to secure the hood 20 and the web 24 in position. The ridge 25 defines a cutout or undercut portion 26 in the web 24, thus providing a recess between said web and the seat 19 which receives a suitable gasket or packing rope 27' for an obvious purpose.

The hood 20 adjacent its forward end is provided with an internal reinforcing rib 28 and its extreme end is positioned over an internal flange formed at the end of the hood 20ª adjacent a reinforcing bead 21'. As shown in Fig. 5, a cushion 23 is secured to the flange 21 by suitable means such as rivets 22 or the like, said cushion serving as an anti-squeak element.

The hood 20ª is of the form illustrated in Figs. 1, 2 and 3, and comprises a substantially semi-cylindrical portion terminating in the before mentioned flange 21 and the enlarged upper portion is provided with an outwardly bent attaching flange 34 for securing the hood, as hereinafter described.

The sides of hood 20ª flare outwardly as illustrated in Fig. 3 and each provides a web 32 the edge of which is similar to that shown in Fig. 2; said webs being secured by screws 27 to the seats 19 and 13'.

A carrying plate 35 is secured to the dash 5 by means of bolts 36 or the like, and said carrying plate is of the form illustrated in Fig. 3; the same being provided with a cut-out portion arranged adjacent the usual opening 9 formed in the dash. Said carrying plate is provided with an inwardly extending flange 37 complemental to the attaching flange 34, heretofore described and to which the end of hood 20ª is secured by means of bolts 38 or the like, the hood 20ª being thus rigidly and securely retained by such connection and the connection of the webs 32 with the frame 11. However, should it be necessary to remove this hood 20ª for any purpose, it is only necessary to remove the before mentioned bolts, whereupon the hood may be lifted off of its seat, as will be obvious.

From the above description it is believed that the invention will be fully apparent to those skilled in the art, it being apparent that the construction provides an arrangement of parts which permits the easy and quick removal of the hood 20 from its position over the generator, without disturbing the hood 20ª, and for almost all purposes the removal of this hood 20 is sufficient. However, as before mentioned, should it be necessary to remove the hood 20ª, it can be easily done.

It will also be apparent that the invention shown and described herein provides a generator cover, the particular mounting means therefor providing a construction which reduces to a minimum the possibility of the loosening of the cover from its secured position on the floor.

What is claimed is:

1. In a motor vehicle having a generator opening in the floor thereof, a frame secured to the floor adjacent the opening and having an inwardly extending supporting flange and a two part cover carried by and secured to said supporting flange, one of said parts being secured to the dash of the vehicle and the other part detachably carried by said first named part and secured to the supporting flange.

2. In a motor vehicle, a generator cover formed of separable hoods, each having an extended attaching web, a frame secured to the floor of the vehicle and having an offset supporting flange to which said attaching webs are secured with the webs in line with said frame, and cushioning means between said webs and the supporting flange.

3. In a motor vehicle, a generator cover formed of separable hoods each having an extended web, a frame secured to the floor of the vehicle and provided with an offset supporting flange on which said webs are seated and secured, and attaching means on the dash of the vehicle for securing one of the hoods thereto.

4. In a motor vehicle having an opening in the floor thereof through which the generator projects, a frame secured to said floor adjacent the opening and having a supporting flange within the opening, a hood secured to the dash of the vehicle and to the supporting flange, and a second hood telescoping the free end of said first named hood and secured to said supporting flange.

5. In a motor vehicle having an opening in the floor thereof through which the generator projects, a frame secured to said floor adjacent the opening and having an offset supporting flange within the opening, a hood secured to the dash of the vehicle and provided with an attaching web secured to said flange, and a second hood supported by said first named hood at the free end of the latter and provided with an attaching web secured to said supporting flange, and cushioning means interposed between said supporting flage and said webs.

6. In a motor vehicle, means for supporting the generator hood comprising a strip secured to the floor of the vehicle and having an undercut outer edge adapted to overlap a floor covering and an inwardly offset supporting flange.

7. In a motor vehicle, a generator cover therefor comprising a hood having a reinforced flanged free end, an attaching flange formed on the opposite end, means on the dash for supporting said hood at the flange, a second hood carried by the reinforced flanged end of said first named hood, a frame secured to the floor of the vehicle, attaching webs formed on the lower edge of each of said hoods and means connecting said hoods to said frame at the webs.

8. In a motor vehicle having a generator opening in the floor thereof, a frame secured to the floor adjacent the opening and lapping the floor covering, an offset flange formed with the frame and arranged within the opening, and a two-part cover supported by the offset flange and secured thereto, one of said parts being secured to the dash of said vehicle and the other part telescopically engaging said first part.

9. In a motor vehicle, a generator cover assembly comprising a frame secured to the vehicle and provided with a supporting flange, a step plate formed with said frame, a carrying plate secured to the dash of the vehicle, a generator cover section secured to the carrying plate and supporting flange, and a second generator cover section secured to the supporting flange and overlappingly engaging the free end of said first named cover section.

10. In a motor vehicle having a generator opening in the floor thereof, a frame secured to the floor adjacent the opening and provided with an offset supporting flange positioned within the opening and having a step plate formed therewith, and a generator cover secured to said offset flange.

11. In a motor vehicle having a generator opening in the floor thereof, a frame secured to the floor adjacent the opening and provided with a supporting flange, a step plate formed with said frame, a two-part generator cover mounted on said supporting flange, and means by which one of said cover parts is secured to the dash of the vehicle.

12. In a motor vehicle having a generator opening in the floor thereof, a cover for said opening, and means mounting said cover comprising a frame secured to the vehicle floor and lapping the floor covering to secure the latter, a supporting flange within the opening, a web extending laterally from the generator cover and positioned over the flange, and a supporting rib formed with said web to support the latter on the flange in alinement with the frame.

13. In a motor vehicle having a floor provided with an opening through which a generator extends, means for enclosing said generator comprising a frame secured to the floor adjacent the opening and having a supporting ledge arranged in said opening, and a cover arranged over the opening and provided with horizontally arranged attaching webs secured to the supporting ledge, the webs being arranged in line with the frame to form floor portions.

14. In a motor vehicle having a generator opening in the floor thereof, a frame secured to the floor adjacent the opening and lapping the floor covering, an offset flange formed with the frame and arranged within the opening, and a cover supported by the offset flange and secured thereto, one of said parts being secured to the dash of said vehicle and the other part telescopically engaging said first part.

In witness whereof I have hereunto set my hand.

FRANK A. WHITTEN.